United States Patent
McLennan

(10) Patent No.: US 8,776,323 B2
(45) Date of Patent: Jul. 15, 2014

(54) CARGO STRAP

(76) Inventor: Richard E. McLennan, Rancho Palos Verdes, CA (US)

( * ) Notice: Subject to any disclaimer, the term of this patent is extended or adjusted under 35 U.S.C. 154(b) by 0 days.

(21) Appl. No.: 12/916,436

(22) Filed: Oct. 29, 2010

(65) Prior Publication Data

US 2012/0181316 A1 Jul. 19, 2012

(51) Int. Cl.
*B60R 9/00* (2006.01)
*B60P 7/08* (2006.01)

(52) U.S. Cl.
CPC .................................. *B60P 7/0823* (2013.01)
USPC .................. 24/170; 24/302; 24/199; 410/97; 248/499

(58) Field of Classification Search
USPC ........... 24/68 R, 68 CD, 68 E, 298, 300–302, 24/192, 195, 199; 410/97, 100; 248/499
See application file for complete search history.

(56) References Cited

U.S. PATENT DOCUMENTS

| | | | | | |
|---|---|---|---|---|---|
| 701,091 | A | * | 5/1902 | Sanders | 24/312 |
| 1,460,756 | A | * | 7/1923 | Humphrey | 24/313 |
| 1,821,839 | A | * | 9/1931 | Kerngood | 24/312 |
| 1,876,196 | A | * | 9/1932 | Amberg | 24/323 |
| 2,002,946 | A | * | 5/1935 | Jacobs | 24/197 |
| 2,538,641 | A | * | 1/1951 | Elsner | 24/170 |
| 2,903,291 | A | * | 9/1959 | Barthule | 294/74 |
| 3,992,756 | A | * | 11/1976 | Stafstrom | 24/323 |
| 4,010,501 | A | * | 3/1977 | Cooke | 441/118 |
| 4,052,095 | A | * | 10/1977 | Johnson | 294/74 |
| 4,111,132 | A | * | 9/1978 | Plut | 410/97 |
| 4,239,271 | A | * | 12/1980 | Beasley et al. | 294/74 |
| 4,501,027 | A | * | 2/1985 | Olsson | 2/321 |
| 4,610,056 | A | * | 9/1986 | Emmert | 24/197 |
| 4,860,408 | A | | 8/1989 | Johnson | |
| 5,193,955 | A | * | 3/1993 | Chou | 410/100 |
| 5,219,636 | A | * | 6/1993 | Golz | 428/193 |
| 5,673,464 | A | | 10/1997 | Whittaker | |
| 6,000,591 | A | * | 12/1999 | Alexander | 224/257 |
| 6,331,024 | B1 | * | 12/2001 | Gulley | 294/74 |
| 6,422,794 | B1 | | 7/2002 | Zhan et al. | |
| 6,637,077 | B2 | * | 10/2003 | Doty | 24/302 |
| 6,705,811 | B1 | * | 3/2004 | Selby | 410/3 |
| 6,808,346 | B2 | | 10/2004 | Zhan et al. | |
| 6,874,208 | B2 | * | 4/2005 | Wong et al. | 24/265 R |
| 2009/0119892 | A1 | * | 5/2009 | Breeden et al. | 24/68 CD |
| 2013/0221047 | A1 | * | 8/2013 | Johnson | 224/463 |
| 2013/0291353 | A1 | * | 11/2013 | Lu | 24/68 E |

* cited by examiner

*Primary Examiner* — Robert J Sandy
*Assistant Examiner* — Michael Lee
(74) *Attorney, Agent, or Firm* — Robert J. Lauson, Esq.; Lauson & Tarver, LLP

(57) ABSTRACT

A strap assembly for securing a vehicle load includes a fixed flat strap secured around a buckle crossbar and a specially configured hook attached to an end of the strap. The parts are configured such that that upon engaging the hook and crossbar there is preferably an interference fit, allowing a major loop to be formed in the strap that will remain securely engaged even when there is slack in the strap. Additionally, the hook/buckle combination is preferably configured such that substantially rotating the hook relative the buckle is required to disengage the two. There is also preferably a second similar hook attached to the opposing end of a second adjustable strap, and a small twisted and/or folded loop built into the strap allowing a second major loop by engaging the second hook with the twisted and/or folded loop.

9 Claims, 3 Drawing Sheets

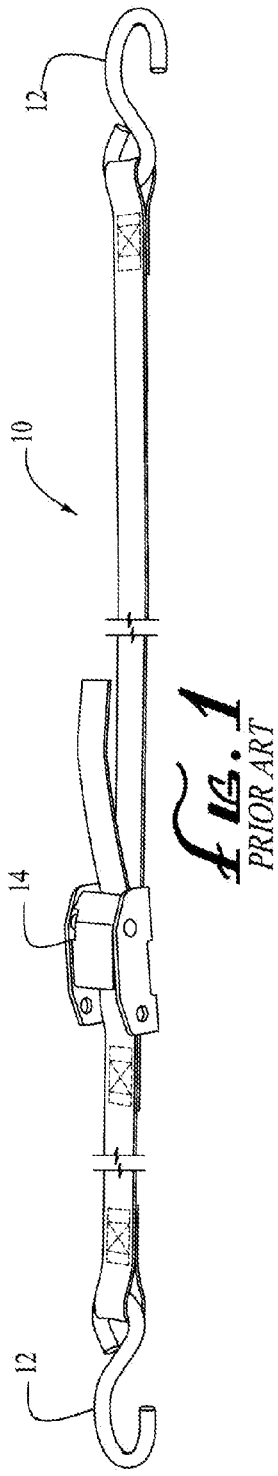
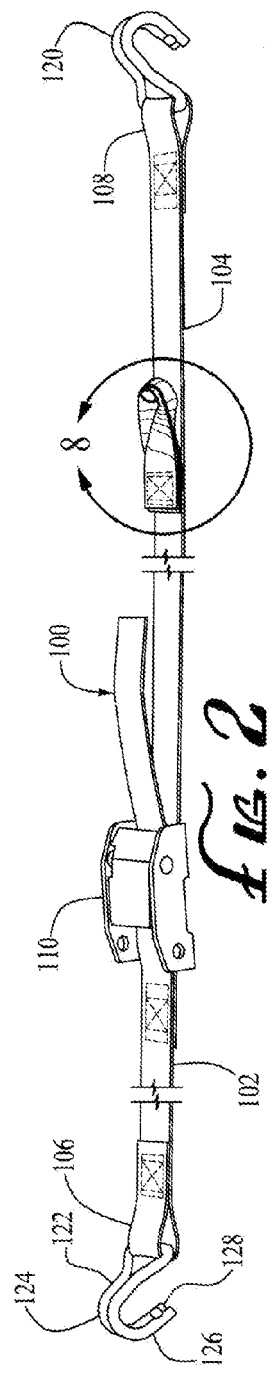
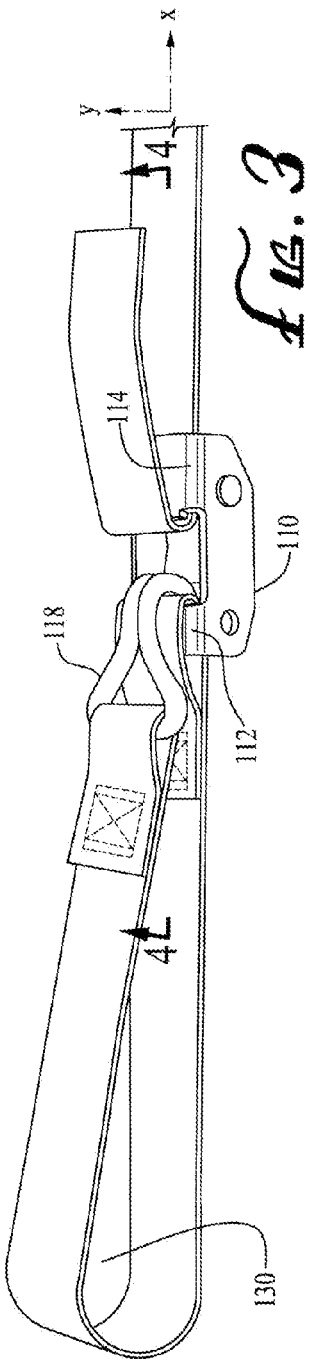
Fig. 1
PRIOR ART
Fig. 2
Fig. 3

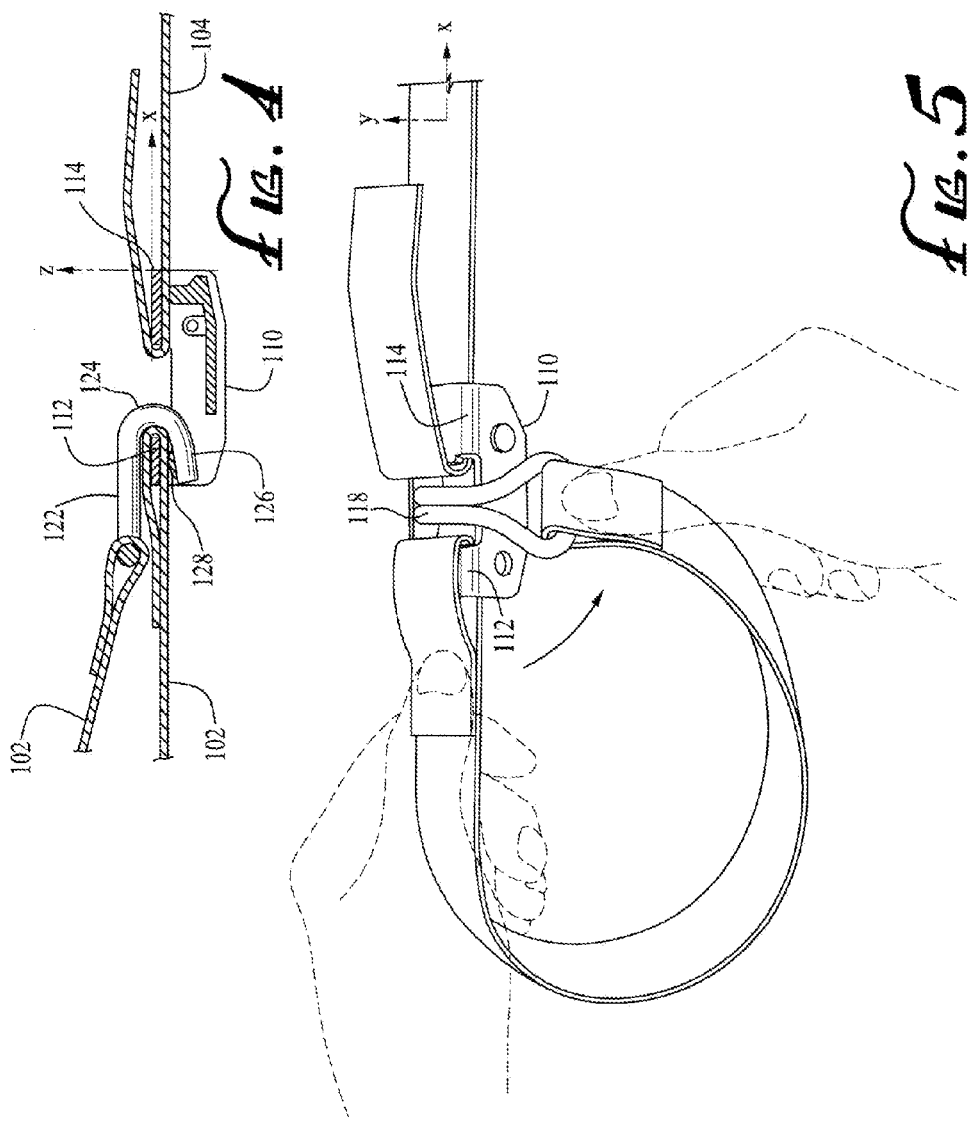

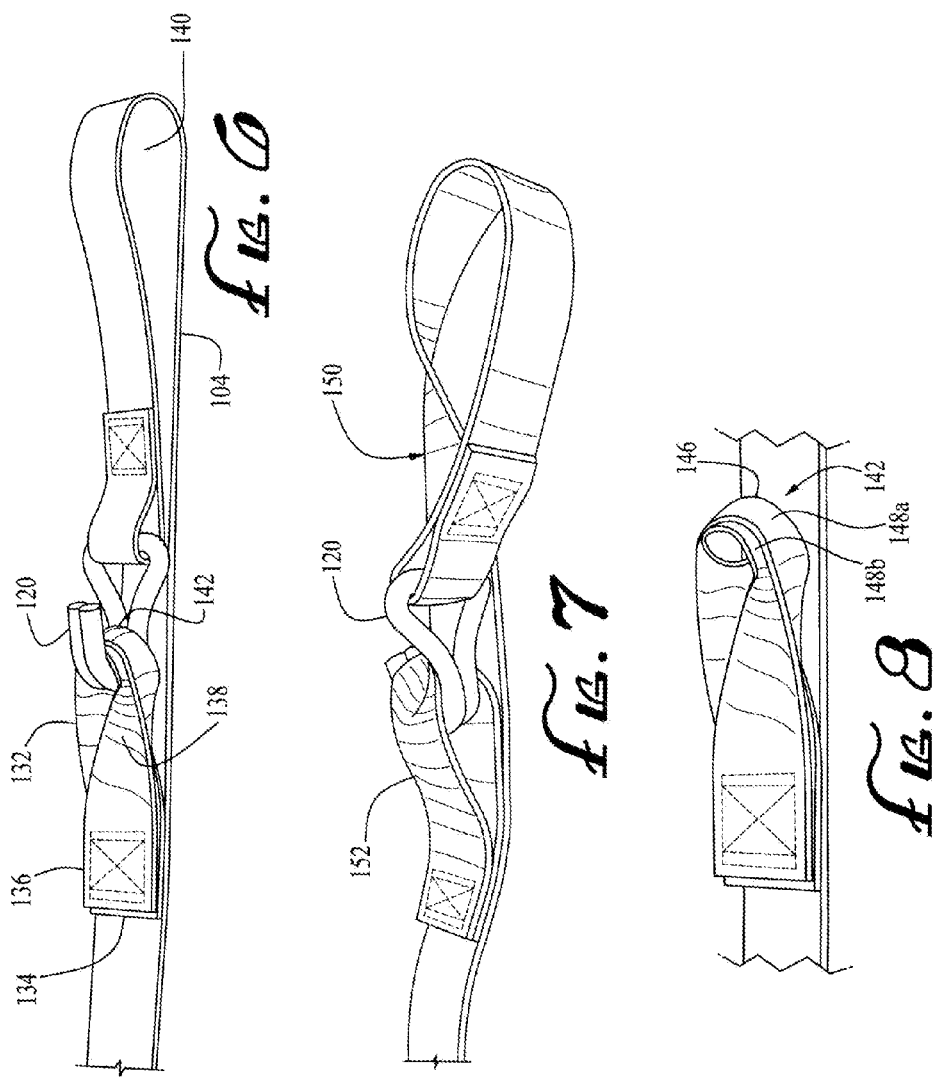

CARGO STRAP

BACKGROUND

This invention pertains to cargo straps for restraining goods being transported, and more particularly to a new strap assembly having cooperating hooks, buckles and loops offering improved functionality.

Securing a load to a vehicle remains a challenge. Whether for transporting a motorcycle or household items in a truck around town or cross country, once such items are in a moving vehicle they tend to continue moving even if the vehicle stops or otherwise changes its speed or heading. If the cargo is not properly secured the consequences are obvious; damaging of the goods or the vehicle and potentially injuring persons in the vicinity.

Various cargo strap assemblies are known and useful for various tasks. Many offer some versatility with the length commonly being adjustable and standard hooks on opposing ends to attach to fixed portions of a truck bed or vehicle interior. The hooks generally are easy to attach and detach from a variety of anchor structures. Many strap assemblies include a buckle to provide adjustability of the length and tensioning, and sometimes connect portions of the strap. This is all preferred over using elongate rope material and attempting to tie a knot at one or both ends or midway along the rope, given the possibility the knot will come loose or undone during transport, which can easily occur in view of jostling of the load or vibration as the vehicle travels. Further it can be difficult to untie a knot in a rope once a destination is reached and it is time to unload the cargo. And it is important to have the rope in tension, to prevent the load from starting to move and gathering momentum that might be difficult to stop. Another problem with ropes is that they easily become twisted and tangled, interfering with their function and ease of use.

Accordingly, there exists a continued need for an improved strap assembly that overcomes the limitations of rope and the prior art, and is embodied in a simple and inexpensive device that is easy to use.

SUMMARY

The present invention resolves many of the above-mentioned problems in the prior art. An improved strap assembly for securing a load to a vehicle includes a generally flat strap secured around a generally flat crossbar of a buckle. The assembly further includes a hook attached to an end of the strap, the hook preferably having two or more prongs joined together, having a first generally straight section, curving and doubling back to a second generally straight section, defining a gap between the first and second sections. That gap is sized so that that upon engaging the hook about the strap secured around the crossbar, the hook is in an interference fit and requires significant force to disengage itself. This allows a major loop to be formed in the strap for securing cargo, and importantly the loop will remain securely engaged if the strap slackens. Optionally, the crossbar may include a retaining pad to contribute to the interference fit.

Alternatively, the special configurations of the hook and buckle cooperate, so the hook does not fall off the buckle when the tension on the strap is relaxed. This accomplished by a portion of the hook being of sufficient size such that it must be substantially rotated relative the buckle to disengage the hook.

The improved cargo strap assembly also preferably includes a second similar hook attached to the opposing end of a second strap, and a much shorter auxiliary strap with both ends being attached to the second strap forming a small loop. Optionally the auxiliary strap may be twisted and/or folded. This construction allows a second major loop to be formed by engaging the second hook with the auxiliary loop.

BRIEF DESCRIPTION OF THE DRAWINGS

FIG. 1 is a perspective view of a prior art strap assembly with conventional hooks and buckle;

FIG. 2 is a perspective view of an improved cargo strap assembly of the preferred embodiment;

FIG. 3 is an enlarged perspective view showing a specially-configured hook engaging the buckle;

FIG. 4 is an enlarged section view again showing the special hook engaging the buckle;

FIG. 5 is an enlarged perspective view showing a user rotating the hook for removal from the buckle;

FIG. 6 is an enlarged perspective view showing the hook engaging a twister and/or folded auxiliary loop;

FIG. 7 is an enlarged perspective view showing a flat auxiliary loop being engaged by the hook; and, FIG. 8 is an enlarged portion of FIG. 2, showing the twisted and/or folded auxiliary loop without hook engagement.

DESCRIPTION

Referring first to FIG. 1, prior art cargo strap assembly 10 is shown. Conventional S hooks 12 are attached at the ends and a conventional buckle 14 is used for adjusting the length of the strap. This strap 10 suffers from the significant disadvantage that the S hooks 12 may become disengaged in view of jostling of the cargo and vibration as the vehicle travels. The S hook 12 is also subject to failure through being deformed by significant loads.

FIGS. 2-5 show Applicant's preferred embodiment strap assembly 100. It includes an elongate, substantially flat first or fixed strap 102 having a first end 106 and a flat second strap 104 having an opposing second end 108. As best shown in FIGS. 3, 4, the buckle 110 has a substantially flat cross bar 112 with the first strap 102 secured around, and further a second similar cross bar 114 with the second strap 104 passing through and providing adjustability as to the effective length of the second strap 104. The hook members 118, 120 are essentially identical. The first hook member 118 has a prong or multiple prongs joined together and a first straight section 122, extending to a curved section 124, and a second straight section 126. Alternately, deposited between the two prongs in the second straight section 126 near the end of the hook 118 is a retaining pad 128.

As best seen in FIG. 5, the hook member 118 prong length and shape are configured relative to the size and spacing of the crossbars 112, 114, so that the hook member 118 can only be disengaged from the buckle 110 by substantially rotating the hook member 118 relative to the buckle 110. By rotating the hook member 118, if in the plane of FIG. 5 approximately 90 degrees, then the second straight section 126 moves from behind the substantially flat crossbar 112, allowing the hook 18 to disengage from the buckle 110 between the crossbars 112, 114.

As best seen in FIG. 4, the length of the prongs and the shape of the hook member 118 define a gap between the first 122 and second 126 sections of the hook member 118. As the hook member 118 is engaged onto the strap 102 secured around the crossbar 112 of the buckle 110, a snug, interference fit is formed, where an optional retaining pad 128 and the second section 126 of the hook 118 protruding into the flexible surface of the flat strap 102. To disengage the hook member 118 from the buckle 110, significant force is required. Accordingly, the loop that is formed will not come loose on its own while the cargo is being transported.

As best shown in FIGS. 2, 6 and 8 the preferred embodiment 100 includes a substantially flat auxiliary strap 132 about 6 inches in length having a first end 134 permanently attached to the second strap 104, and a second end 136 of the auxiliary strap 132 twisted a single time and folded back and permanently attached to the first end 134, forming a twisted loop 138. The auxiliary strap 132 is lengthwise folded at fold 146 along the loop to define a multi-layered intermediate portion 142 having fold layers 148a, 148b. The loop extends about an axis substantially normal to a planar surface portion defined by the adjustable strap 104. This enables a second major loop 140 to be formed in the strap assembly 100 (FIG. 6). FIG. 7 shows an alternate configuration, a strap 150 with a flat auxiliary loop 152 for engaging the multi-pronged hook 120.

Having described the structure of the improved cargo straps of the preferred embodiments, it is now possible to describe its operation, function and use. By way of example, if a motorcycle is to be tied down to a truck bed, or an article of furniture secured to an interior van wall, it is desirable to employ one or more strap assemblies of adjustable length with hooking members on the ends attachable to anchors on the transport vehicle. Additionally, frequently it is desirable that the strap assembly have the capability to form a secure loop, for attachment to a portion of the article to be held down, and that the strap assembly be of adjustable length.

These desired capabilities are all met by the preferred embodiment cargo strap assembly 100. The strap assembly 100 includes specially configured hook members 118, 120 that can be attached to transport vehicle anchors (not shown), or alternatively used to form major loops 130, 140. The major loop 130 is formed by engaging the hook member 118 to the crossbar 112 of the buckle 110, and the hook member 118 is preferably specially configured to have an interference fit with the buckle 110 that will not come loose during transport, or as described above the configurations of the hook 118 and buckle 110 cooperate to remain engaged until disengaged by the user. The major loop 140 is formed by engaging the hook 120 with the special loops 138 or 152. The strap assembly 110 is also of adjustable length as the second strap 104 may slide through the buckle 110.

While the present invention has been described with regards to a particular embodiment, it is recognized that additional variations of the present invention may be devised by persons skilled in the art without departing from the inventive concepts disclosed herein.

What is claimed is:

1. A cargo strap assembly for securing a load to a vehicle, comprising:
    an elongate substantially flat strap having a first end;
    a buckle having a first cross bar;
    the substantially flat strap secured around the first cross bar;
    a hook member attached to the first end of the substantially flat strap;
    the hook member having a body and an end spaced apart defining a gap therebetween;
    the strap assembly configured such that a major loop can be formed by engaging the gap in the hook member about the first crossbar; and
    wherein the hook member is sized for an interference fit on the first crossbar, and requiring substantial force to disengage the hook member from the first cross bar.

2. The cargo strap assembly of claim 1 wherein the hook member has multiple prongs joined together.

3. The cargo strap assembly of claim 1 wherein said hook member and the buckle are configured such that said hook member disengages from said buckle by forcibly rotating said hook member relative to said buckle approximately ninety (90) degrees.

4. The cargo strap assembly of claim 1, the buckle further having a second crossbar spaced apart from the first crossbar, and wherein the hook member is configured not to disengage and pass between the crossbars without being substantially rotated about in a plane defined by the flat strap extending longitudinally.

5. A cargo strap assembly for securing a load to a vehicle, comprising:
    an elongate substantially flat strap having a first end and extending longitudinally therefrom;
    a buckle;
    the flat strap secured to the buckle;
    a hook member attached to the first end of the substantially flat strap; and,
    the strap assembly configured such that a major loop can be formed by engaging the hook member about the buckle;
    wherein said hook member and the buckle are further configured such that said hook member disengages from said buckle by substantially rotating said hook member relative to said buckle about in a plane defined by the flat strap extending longitudinally.

6. A cargo strap assembly for securing a load to a vehicle, comprising:
    an elongate substantially flat adjustable strap having a first end and a second end;
    a hook member attached to the second end of the adjustable strap;
    a substantially flat auxiliary strap having a first end and a second end;
    the first end of the auxiliary strap being fixed to the adjustable strap the adjustable strap defining a planar surface portion;
    the auxiliary strap second end fixed to the cargo strap assembly to form a loop, the auxiliary strap being twisted a single time and lengthwise folded along the loop to define a multi-layered intermediate portion, the auxiliary strap thereby forming a twisted and folded loop for engaging of the hook member when forming a major loop of the adjustable strap, wherein the loop extends about an axis substantially normal to the planar surface portion.

7. The cargo strap assembly of claim 6 further comprising a buckle engaging the adjustable strap.

8. The cargo strap assembly of claim 7 further comprising a fixed strap attached to the buckle, the fixed strap having a hook member attachable to the buckle to form a second major loop.

9. A cargo strap assembly for securing a load to a vehicle, comprising:
    a first strap having a hook member;
    a buckle having a first end extending longitudinally to an opposing second end configured to receive a second strap;
    the first strap attached to the first end of the buckle and configured such that a major loop can be formed by engaging the hook member to the buckle;
    wherein said hook member and buckle are further configured such that said hook member disengages from said buckle by substantially rotating said hook member relative to said buckle about in a longitudinal plane defined by the opposing first and second ends of the buckle.

\* \* \* \* \*